United States Patent
Stancu et al.

(10) Patent No.: US 6,413,348 B2
(45) Date of Patent: Jul. 2, 2002

(54) METHOD OF FORMING A BLOW-MOLDED PLASTIC PART HAVING A LIVING HINGE

(75) Inventors: Sorin Stancu, Dearborn, MI (US); Anthony Spagnuolo, Windsor (CA); Michael P. Schoemann, Waterford, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 09/871,523

(22) Filed: May 31, 2001

Related U.S. Application Data

(63) Continuation-in-part of application No. 09/344,774, filed on Jun. 28, 1999.

(51) Int. Cl.$^7$ .......................... B29C 49/22; B32B 31/20
(52) U.S. Cl. ...................... 156/245; 156/245; 156/292; 156/309.6; 264/234; 264/245; 264/257; 264/263; 264/265; 264/266; 264/294; 264/296; 264/319; 264/345; 264/510
(58) Field of Search ................................ 264/245, 257, 264/263, 265, 266, 294, 296, 319, 345, 234, 510; 156/196, 245, 309.6, 292

(56) References Cited

U.S. PATENT DOCUMENTS

| | | |
|---|---|---|
| 4,563,381 A | 1/1986 | Woodland |
| 4,636,065 A | 1/1987 | Kanemitsu et al. |
| 4,885,820 A | 12/1989 | Erceg et al. |
| 5,115,855 A | 5/1992 | Lindblom et al. |
| 5,432,676 A | 7/1995 | Satoh et al. |
| 5,463,794 A | 11/1995 | Erland |
| 5,560,175 A | 10/1996 | Soyka, Jr. et al. |
| 5,560,669 A | 10/1996 | Gute |
| 5,762,852 A | 6/1998 | Hettinga |
| 5,775,500 A | 7/1998 | Williams |
| 5,842,730 A | 12/1998 | Schneider et al. |
| 5,964,491 A | * 10/1999 | Marsh et al. ............. 296/37.16 |
| 6,136,259 A | * 10/2000 | Puffenberger et al. ...... 264/515 |

FOREIGN PATENT DOCUMENTS

| | | |
|---|---|---|
| EP | 0 791 450 A1 | 8/1997 |
| GB | 1 090 846 A | 11/1967 |
| GB | 1 176 813 A | 1/1970 |
| WO | WO 94 12334 A | 6/1994 |

OTHER PUBLICATIONS

Patent Abstract of Japan, Tachi S Co. Ltd., Publication No. 08047967, Publication Date: Aug. 8, 1994.
International Search Report.

* cited by examiner

Primary Examiner—Suzanne E. McDowell
(74) Attorney, Agent, or Firm—Brooks & Kushman P.C.

(57) ABSTRACT

A method of forming a carpeted plastic part includes positioning a carpet between first and second mold halves, wherein the carpet has a back surface. A non-reinforced plastic strip is positioned adjacent a portion of the back surface of the carpet. A hollow parison of reinforced plastic material is formed between the first and second mold halves. The first and second mold halves are then closed together to form a carpeted plastic part having a thinned-down region of the reinforced plastic material adjacent the plastic strip such that the plastic strip is sandwiched between the thinned-down region and the carpet to form a flexible living hinge.

13 Claims, 2 Drawing Sheets

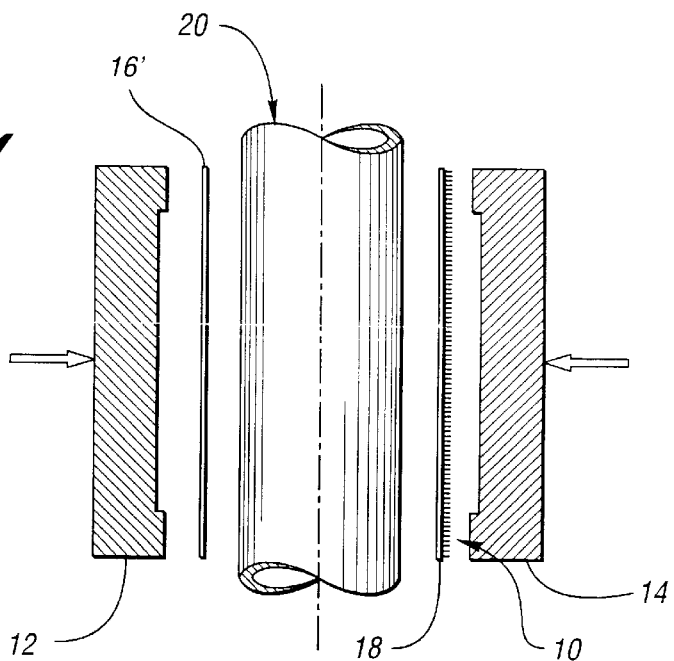
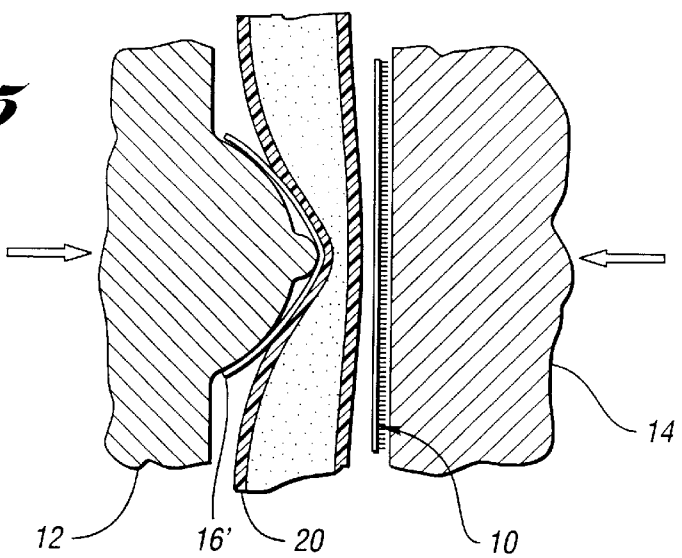
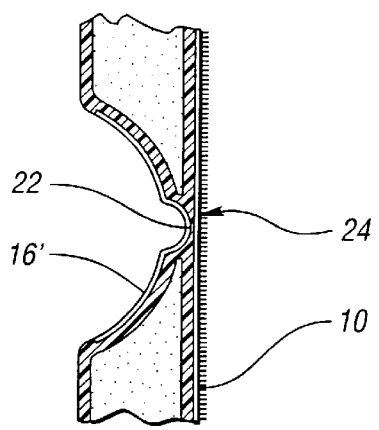

METHOD OF FORMING A BLOW-MOLDED PLASTIC PART HAVING A LIVING HINGE

CROSS-REFERENCE TO RELATED APPLICATION

This application is a continuation-in-part of U.S. application Ser. No. 09/344,774, filed Jun. 28, 1999.

BACKGROUND OF THE INVENTION

1. Field of the Invention

The present invention relates to a blow-molded plastic part having a non-reinforced plastic strip integrally molded therein to form a durable living hinge.

2. Background Art

Plastic components sometimes require significant load-bearing characteristics, such as in vehicle load floors and the like. In order to provide these load-bearing characteristics the plastic material may be reinforced by glass filling for example. However, this filling may also render the part brittle and not suitable for a living hinge.

It is also sometimes desirable to provide an integral hinge in the reinforced plastic component to allow respective bending of adjacent portions of the plastic component, for example to form a pivotable door for access to a spare tire storage compartment or the like. Because reinforced materials are so brittle, a living hinge typically cannot be formed in the material to allow pivoting, therefore metal hinges have been used in such applications. However, metal hinges result in significant material and labor costs. It is therefore desirable to provide a method of forming a reinforced plastic part with a hinge in which manufacturing costs are reduced.

SUMMARY OF THE INVENTION

The present invention provides a method of manufacturing a reinforced plastic part, such as a glass-filled plastic part, wherein a living hinge is formed by integrally molding an unfilled plastic strip in the part to form the living hinge.

More specifically, the present invention provides a method of forming a carpeted plastic part wherein a carpet is positioned between first and second mold halves. A non-reinforced plastic strip is positioned adjacent a portion of the back surface of the carpet. A hollow parison of reinforced plastic material is positioned between the first and second mold halves. The first and second mold halves are closed together to form a carpeted plastic part having a thinned-down region of the reinforced plastic material adjacent the plastic strip such that the plastic strip is sandwiched between the thinned-down region and the carpet to form a flexible living hinge.

Preferably, the non-glass-filled plastic strip is a biaxially oriented plastic material which is stretchable along two axes, such as a polypropylene material.

The present invention could be used for forming a living hinge in any stiff material, such as a glass-filled plastic, mica-filled plastic, talc-filled plastic or other structurally reinforced plastic material.

The non-reinforced plastic strip may be positioned between the carpet and the parison, or it may be positioned on the opposite side of the parison from the carpet.

Accordingly, an object of the invention is to provide a method of forming a durable living hinge in a load-bearing plastic component.

A further object of the invention is to provide a method of forming a durable living hinge in a carpeted load-bearing plastic part, such as a vehicle load floor, in a manner in which manufacturing costs are reduced.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 4 shows an exploded side elevational view of the mold, parison, plastic strip and carpet in accordance with an alternative embodiment of the invention;

FIG. 5 shows a partial vertical cross-section of the assembly of FIG. 4 with the mold halves closing together; and FIG. 6 shows a partial vertical cross-sectional view of a molded part in accordance with the embodiment of FIGS. 4 and 5.

DETAILED DESCRIPTION OF THE PREFERRED EMBODIMENTS

The present invention is particularly useful, for example, in forming carpeted vehicle load floors, which require significant load-bearing characteristics. However, the present invention would also be useful in forming a living hinge in any reinforced plastic component. The term "reinforced" as used herein refers to a plastic component which is glass-filled, mica-filled, talc-filled or otherwise reinforced for added strength.

Figure 1:
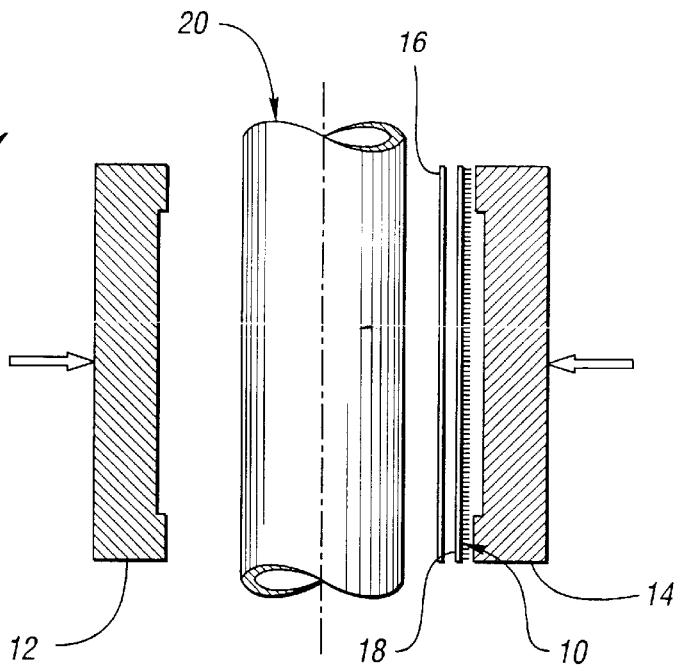
FIG. 1 shows an exploded side elevational view of the mold, parison, plastic strip and carpet in accordance with the present invention.

The present invention is described with reference to FIGS. 1–3. As shown, a carpet 10 is positioned between first and second mold halves 12,14. It is commonly known to integrally mold carpet components with plastic parts, such as for vehicle interior components, including doors, load floors, etc.

A non-reinforced plastic strip 16 is positioned adjacent a portion of the back surface 18 of the carpet 10. In a preferred embodiment, the plastic strip 16 is a polypropylene material. Such a material is biaxially oriented such that it is stretchable along two axes, thereby enabling it to act as a durable living hinge. Prior to closing the first and second mold halves 12,14 together, the plastic strip 16 may be adhesively secured to the back surface 18 of the carpet 10 to hold the plastic strip 16 in position before the mold halves 12,14 are closed together.

A hollow parison 20 of glass-filled plastic material is positioned between the first and second mold halves 12,14. The parison 20 is a hollow extruded tube of hot, pliable material which is expanded by pressurized air within the tube. This method is commonly known in the art for forming hollow plastic parts.

It is preferable to heat the plastic strip 16 prior to the closing of the mold halves 12,14 to enhance bonding of the plastic strip 16 with the material of the parison 20. For example, with a polypropylene plastic strip 16, it is preferable to heat the polypropylene to approximately 300° F. prior to closing the first and second mold halves 12,14 together to enhance bonding with the parison material 20.

Improper bonding of the plastic strip 16 with the parison material will limit useful life of the living hinge.

Figure 2:
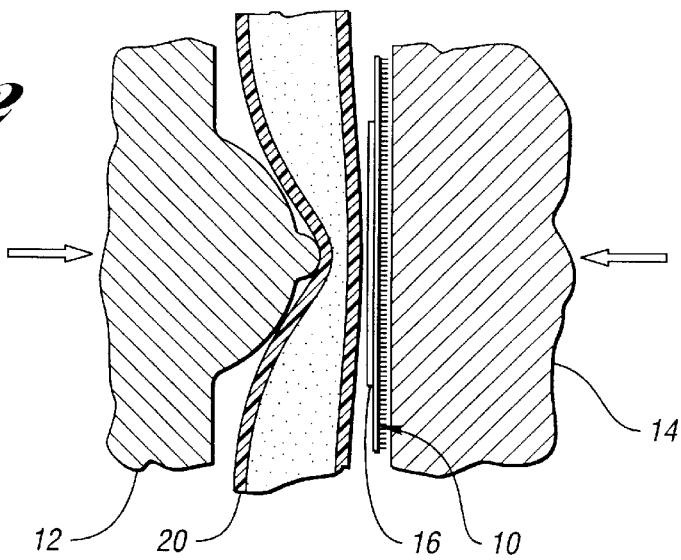
FIG. 2 shows a partial vertical cross-section of the assembly of FIG. 1 with the mold halves closing together.

As shown in FIG. 2, the first and second mold halves 12,14 are then closed together to force the parison 20, plastic strip 16 and carpet 10 together. The mold halves 12,14 are held together until the molded part has assumed the desired shape and cooled.

Figure 3:
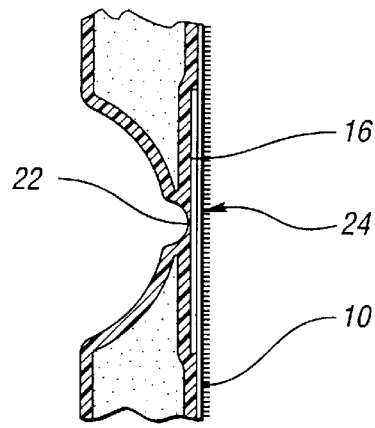
FIG. 3 shows a partial vertical cross-sectional view of a molded part in accordance with the present invention.

As shown in FIG. 3, the closing of the mold halves 12,14 together against the parison 20 forms a thin-downed region 22 of the glass-filled material 20 immediately adjacent the plastic strip 16. In this area of the thinned-down portion 22, the carpet 10, plastic strip 16 and thinned-down portion 22 form the flexible living hinge 24.

In this configuration, the body of the glass-filled material 20 forms a structurally rigid load-bearing component while the living hinge 24 enables pivotal movement of adjacent portions of the load-bearing component, such as for a spare tire storage door, or the like.

Because the plastic strip 16 is a biaxially oriented plastic material, such as a polypropylene or other non-reinforced plastic, the material is stretchable along two axes. Those materials which are oriented along a single axis will tend to break after a few cycles, whereas the biaxially oriented materials are much more durable for bending. The thinned-down portion 22 will likely break after a few cycles, but the plastic strip will remain in tact and operative as the living hinge.

A further advantage of the invention is that the entire assembly is recyclable with the elimination of the metal hinge.

FIGS. 4–6 illustrate an alternative embodiment of the invention wherein the non-reinforced plastic strip 16' is positioned between the parison 20 and the mold half 12, as opposed to being positioned between the parison 20 and carpet 18. As shown, similarly to the embodiment described above with reference to FIGS. 1–3, the non-reinforced plastic strip 16' is compressed against the hollow parison 20 and the carpet 10 to form the final assembly shown in FIG. 6 in which the non-reinforced plastic strip 16' cooperates with the thinned down portion 24 of the hollow parison 20 and the carpet 10 to form a flexible hinge for the carpet 10.

While the best mode for carrying out the invention has been described in detail, those familiar with the art to which this invention relates will recognize various alternative designs and embodiments for practicing the invention within the scope of the appended claims.

What is claimed is:

1. A method of forming a plastic part with a living hinge comprising:

positioning a non-reinforced plastic strip between first and second mold halves;

forming a hollow parison of reinforced plastic material between the first and second mold halves; and closing the first and second mold halves together to form a thinned-down region of reinforced plastic material adjacent the plastic strip such that the plastic strip and the thinned-down region form a flexible living hinge.

2. The method of claim 1, further comprising heating said plastic strip prior to said step of positioning the plastic strip between the first and second mold halves.

3. The method of claim 1, further comprising positioning a carpet between the first and second mold halves.

4. The method of claim 3, wherein the non-reinforced plastic strip is positioned between the carpet and the hollow parison.

5. The method of claim 3, wherein the hollow parison is positioned between the non-reinforced plastic strip and the carpet.

6. The method of claim 1, wherein said step of positioning a non-reinforced plastic strip comprises positioning a biaxially oriented plastic material which is stretchable along two axes.

7. A method of forming a carpeted plastic part comprising:

positioning a carpet between first and second mold halves, wherein the carpet has a back surface;

positioning a non-reinforced plastic strip between the first and second mold halves;

forming a hollow parison of reinforced plastic material between the first and second mold halves adjacent the carpet and plastic strip; and closing the first and second mold halves together so that the hollow parison, carpet and plastic strip are joined together to form a carpeted plastic part having a thinned-down region of the reinforced plastic material adjacent the plastic strip such that the thinned-down region, the plastic strip, and the carpet form a flexible living hinge.

8. The method of clam 7, further comprising heating said plastic strip prior to said step of positioning the plastic strip adjacent a portion of the carpet.

9. The method of claim 7, further comprising adhesively securing the plastic strip to the carpet.

10. The method of claim 7, wherein said step of positioning a non-reinforced plastic strip comprises positioning a biaxially oriented plastic material which is stretchable along two axes.

11. The method of claim 7, wherein said step of positioning a non-reinforced plastic strip comprises positioning a polypropylene strip having a thickness of approximately 0.5 mm.

12. The method of claim 7, wherein the non-reinforced plastic strip is positioned between the carpet and the hollow parison.

13. The method of claim 7, wherein the hollow parison is positioned between the non-reinforced plastic strip the carpet.

* * * * *

UNITED STATES PATENT AND TRADEMARK OFFICE
CERTIFICATE OF CORRECTION

PATENT NO. : 6,413,348 B2
DATED : July 2, 2002
INVENTOR(S) : Stancu et al.

It is certified that error appears in the above-identified patent and that said Letters Patent is hereby corrected as shown below:

<u>Column 4,</u>
Line 52, after "strip" and before "the", second occurrence, insert -- and --.

Signed and Sealed this

Nineteenth Day of November, 2002

*Attest:*

*Attesting Officer*

JAMES E. ROGAN
*Director of the United States Patent and Trademark Office*